(12) United States Patent
Boyer et al.

(10) Patent No.: US 9,158,444 B2
(45) Date of Patent: Oct. 13, 2015

(54) USER INTERFACE FOR MANAGING COMMUNICATION SESSIONS

(75) Inventors: David G. Boyer, Oceanport, NJ (US); Narunas Bukauskas, Brooklyn, NY (US); Tom Coombs, London (GB); Trung Dinh-Trong, Bedminster, NJ (US); Birgit Geppert, Basking Ridge, NJ (US); Thomas Kleist, Redbourn (GB); Frank Roessler, Baking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 761 days.

(21) Appl. No.: 12/978,884

(22) Filed: Dec. 27, 2010

(65) Prior Publication Data

US 2011/0296312 A1    Dec. 1, 2011

Related U.S. Application Data

(60) Provisional application No. 61/348,550, filed on May 26, 2010.

(51) Int. Cl.
*G06F 3/048* (2013.01)
*G06F 3/0488* (2013.01)

(52) U.S. Cl.
CPC .................................. *G06F 3/0488* (2013.01)

(58) Field of Classification Search
CPC .................................................... G06F 3/0488
See application file for complete search history.

(56) References Cited

U.S. PATENT DOCUMENTS

| | | | | |
|---|---|---|---|---|
| 5,533,110 A | * | 7/1996 | Pinard et al. | 379/355.01 |
| 5,627,978 A | * | 5/1997 | Altom et al. | 715/758 |
| 5,717,863 A | * | 2/1998 | Adamson et al. | 709/204 |
| 5,745,716 A | * | 4/1998 | Tchao et al. | 715/777 |
| 6,191,807 B1 | * | 2/2001 | Hamada et al. | 348/14.07 |
| 6,278,454 B1 | * | 8/2001 | Krishnan | 715/846 |
| 6,664,983 B2 | * | 12/2003 | Ludolph | 715/775 |
| 6,850,255 B2 | * | 2/2005 | Muschetto | 715/788 |
| 7,478,129 B1 | * | 1/2009 | Chemtob | 709/204 |
| 7,616,751 B2 | | 11/2009 | Mohler | |
| 8,312,422 B2 | * | 11/2012 | Karatal et al. | 717/105 |

(Continued)

OTHER PUBLICATIONS

Dan Saffer, "3x2x2: A New Method of Thumb Typing for Tablet Computers." Apr. 27, 2010. http://www.kickerstudio.com/blog/2010/04/3x2x2-a-new-method-of-thumb-typing-for-tablet-computers/.

(Continued)

*Primary Examiner* — Ryan Pitaro (57) ABSTRACT

Disclosed herein are systems, methods, and non-transitory computer-readable storage media for displaying a user interface for managing communication sessions on a communication device. A system configured to practice the method displays, on a first side portion of the user interface, a first set of user-configurable communication information. The system displays, a second side portion of the user interface, a second set of user-configurable communication information. The system displays, on a center portion of the user interface, a communication work space for managing communication sessions. In one embodiment including a touch sensitive display, this interface is used with a tablet device such that a natural position of user's thumbs are in an optimal position to interact efficiently with the user interface. The side portions can be user-configurable to display, for example, contacts, calendar events, tasks, memos, and so forth.

20 Claims, 9 Drawing Sheets

(56) References Cited

U.S. PATENT DOCUMENTS

| | | | |
|---|---|---|---|
| 8,418,067 B2* | 4/2013 | Cheng et al. | 715/745 |
| 8,736,557 B2* | 5/2014 | Chaudhri | 345/173 |
| 2003/0160815 A1* | 8/2003 | Muschetto | 345/733 |
| 2005/0278647 A1* | 12/2005 | Leavitt et al. | 715/765 |
| 2006/0095865 A1* | 5/2006 | Rostom | 715/810 |
| 2006/0271864 A1* | 11/2006 | Satterfield et al. | 715/764 |
| 2006/0271869 A1* | 11/2006 | Thanu et al. | 715/764 |
| 2007/0094597 A1* | 4/2007 | Rostom | 715/700 |
| 2007/0150830 A1* | 6/2007 | Ording et al. | 715/784 |
| 2007/0157114 A1* | 7/2007 | Bishop et al. | 715/787 |
| 2007/0234220 A1* | 10/2007 | Khan et al. | 715/745 |
| 2008/0086699 A1* | 4/2008 | Antikainen et al. | 715/784 |
| 2008/0250386 A1* | 10/2008 | Erl | 717/100 |
| 2008/0270894 A1* | 10/2008 | Whittle et al. | 715/256 |
| 2009/0059818 A1* | 3/2009 | Pickett | 370/259 |
| 2009/0303187 A1 | 12/2009 | Pallakoff | |
| 2010/0011314 A1* | 1/2010 | Peterson | 715/779 |
| 2010/0285785 A1* | 11/2010 | Wang et al. | 455/418 |
| 2010/0318928 A1* | 12/2010 | Neuman et al. | 715/769 |
| 2011/0041092 A1* | 2/2011 | Zhang | 715/777 |
| 2011/0087983 A1* | 4/2011 | Shim | 715/769 |
| 2011/0258550 A1* | 10/2011 | Dinh-Trong et al. | 715/736 |
| 2012/0254772 A1* | 10/2012 | Blagsvedt et al. | 715/752 |
| 2014/0189005 A1* | 7/2014 | Dinh-Trong et al. | 709/204 |

OTHER PUBLICATIONS

Marc Perton Origami UI on CeBIT web site. Mar. 8, 2006 http://www.engadget.com/2006/03/08/cebit-web-site-shows-origami-ui/.

"Spatial Interactive Visualization on Small Screen3", *Proceedings of the 7th international Conference on Human Computer interaction with Mobile Devices& Services* (Salzburg, Austria, Sep. 19-22, 2005).

Khan et al. "Spotlight: Diercting Users' Attention on Large Displays," CHI 2005, PAPERS: Enhancing Virtual Spaces and Large Displays, Apr. 2-7, Portland, Oregon, USA.

* cited by examiner

USER INTERFACE FOR MANAGING COMMUNICATION SESSIONS

RELATED APPLICATIONS

This application claims priority to U.S. Provisional Application 61/348,550, filed 26 May 2010, the contents of which are herein incorporated by reference in their entirety.

BACKGROUND

1. Technical Field

The present disclosure relates to communications and more specifically to intuitive user interfaces for managing communications.

2. Introduction

Manufacturers of touch tone telephones, such as phones meeting ITU-T standard Q.23, have supplemented the functionality of touch tone telephones over the years by adding feature buttons and menus. Users can activate simple features via buttons, and more complex features via hierarchical menus actuated by track balls, quadrant style pointers and the like. Some telephones, such as smartphones and other mobile phones, include touch sensitive displays are also known. However, these touch screen telephones simply replace touchtone buttons and feature buttons or menus with actuator buttons designated by an icon on the touch screen that is delineated as the equivalent functionality. Touch screen telephones have advanced the art a bit by allowing the user to touch an entry in a contact database to call that contact or touch a message to contact the caller who left the message. In addition, there is click to call capability within some IP Softphones.

User testing indicates that certain features make such a user interface more intuitive. Many people have trouble remembering and implementing specific button sequences for advanced functionality, such as a conference call, selectively drop a caller, place on hold, and answer new calls. In addition, the use of feature buttons and the appropriate sequences of feature buttons can also be confusing. This problem is exacerbated by innumerable user interface variations from brand to brand and from model to model. This unintuitive interface leads to mistakes such as dropped calls and, as a result, lost productivity.

These problems are made worse in mobile platforms. For example, when an individual holds a tablet sized phone, PC or other electronic device, the individual's fingers must simultaneously provide both the function of support and touch screen or key activation. Typically, such devices have borrowed from the desktop, i.e. mouse and keyboard driven, metaphor by utilizing drop down menus. Commonly, these drop down menus are located at the top of the screen. This results in a very non ergonomic arrangement for a handheld device.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Mobile communication device interfaces can be far more intuitive for their specific use cases than the traditional keyboard and mouse driven window and desktop based metaphor. A communications device interface can clearly show call connections, conferences, sidebars, parties, lines to be disconnected and the like. Further a graphical call connection metaphor can be agnostic to the type of touch screen device and can be agnostic to systems that are handling the calls, e.g., the user does not need to know what the system must do to implement user-entered commands.

Disclosed are systems, methods, and non-transitory computer-readable storage media for displaying a user interface for managing communication sessions on a communications device. The system displays, on a first side portion of the user interface, a first set of user-configurable communication information and displays, on a second side portion of the user interface, a second set of user-configurable communication information. The communications device can receive user input via a touch sensitive display via skin contact and/or a stylus, for example. The device can also receive other inputs such as gestures, keyboard input, mouse input, and so forth. The first set of user-configurable communication information and the second set of user-configurable communication information can each be, for example, contact information, schedule information, current communication session information, applications, and/or other multimedia communication features. Contact information can include a name, phone number, email address, instant messaging address, social media link, an image, presence information, relationship information, business information, personal notes, and other communication links. The system can display the contact information based on at least one of alphabetical order and frequency of use. The frequency of use can be based further on at least one of topic, project, and recency of use. In one embodiment, a level of trust between a user and a particular contact restricts which pieces of contact information are displayed for the particular contact. Contacts can be organized in the fan of contacts into expandable groups. The side portions of the user interface can be, for example, on the left side and right side of the device screen. The fans can include an index associated with the first set of user-configurable communication information, such as an alphabetical index to quickly jump to a particular set of information.

The system 100 displays, on a center portion of the user interface, a communication work space including an active spotlight region. The work space can display at least one current communication session. The interface can also include controls and settings based on the at least one current communication session. In one aspect, the system further receives user input to toggle from an active communication session from a first current communication session to a second communication session, sets the second communication session as the active communication session, and updates the communication work space to reflect the active communication session. The specific user interface, system architecture, and method examples provided below are illustrative and can be implemented in different ways without departing from the spirit and scope of the disclosure.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved user interfaces for managing communications. A system, method and non-transitory computer-readable media are disclosed for displaying a user interface for managing communication sessions on a communications device. A brief introductory description of a basic general purpose system or computing device in FIG. 1 which can be employed to practice the concepts is disclosed herein. A more detailed description of methods and graphical interfaces will then follow. These variations shall be discussed herein as the various embodiments are set forth. The disclosure now turns to FIG. 1.

Figure 1:
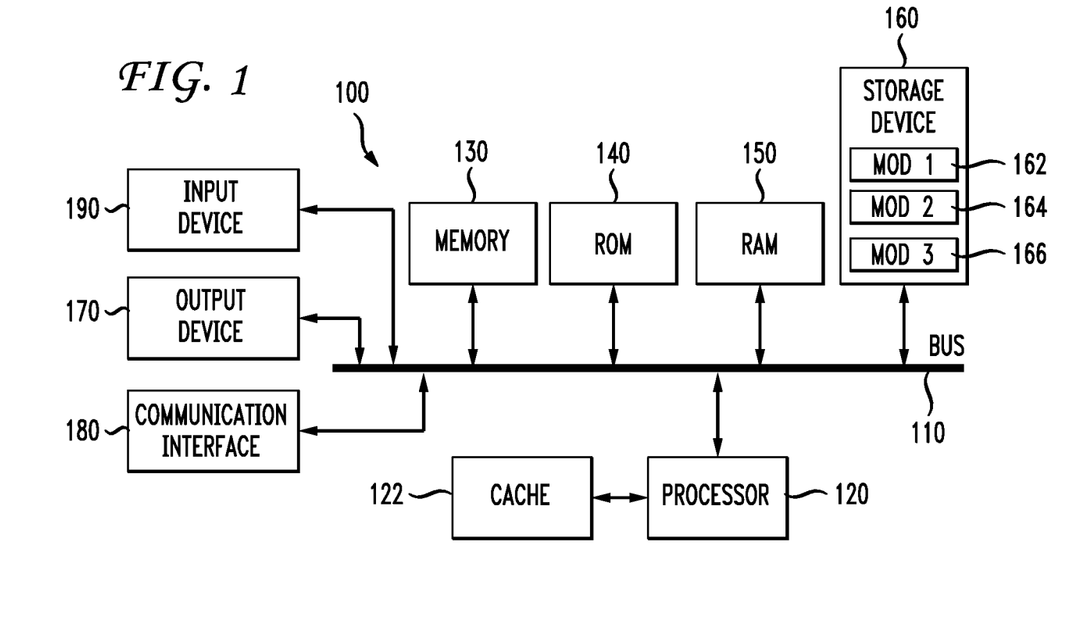
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
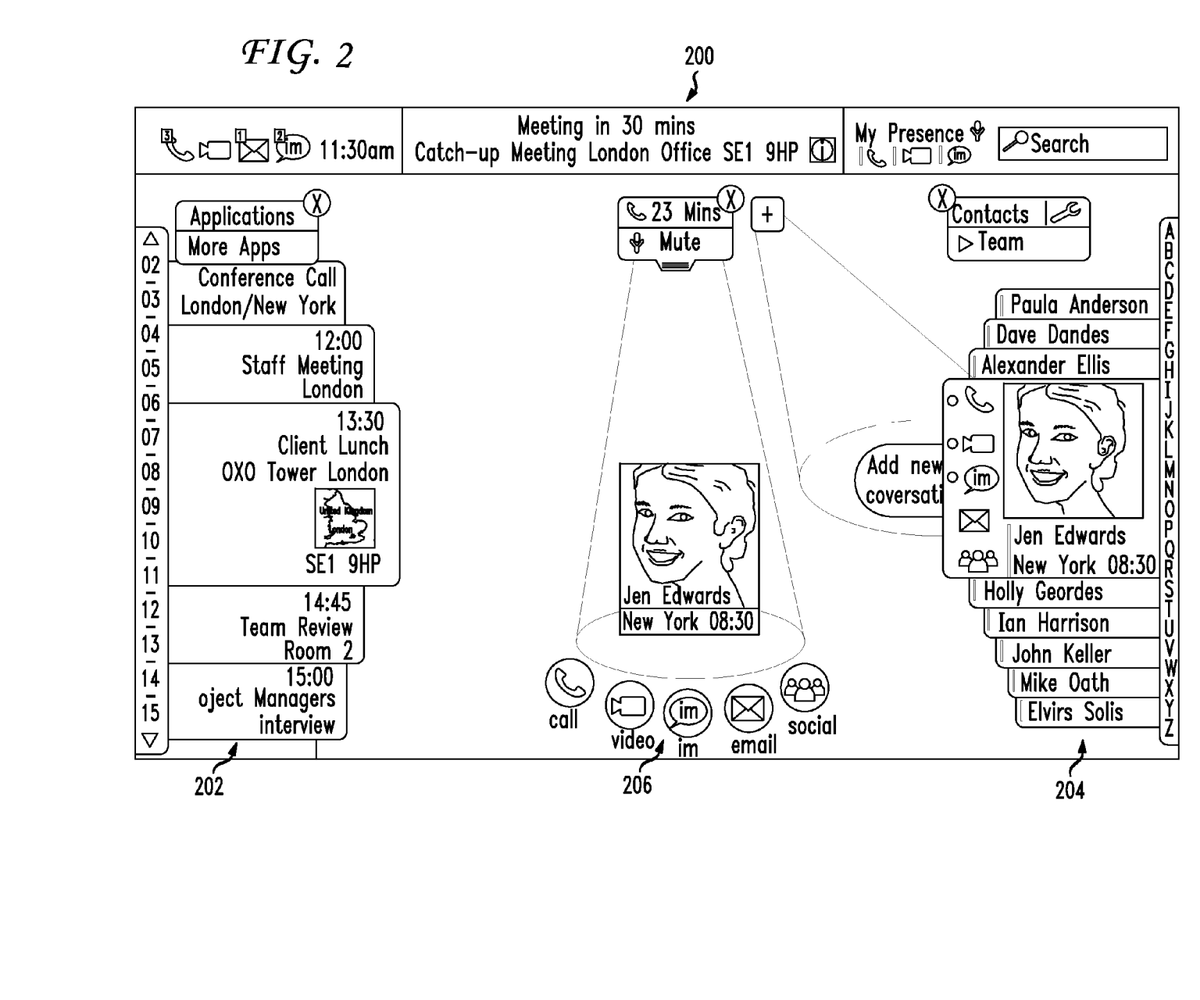
FIG. 2 illustrates a first example user interface.

Having disclosed some basic computing system components, the disclosure turns to the first example user interface 200 illustrated in FIG. 2. This interface shows a first side portion 202, a second side portion 204, and a center portion 206. The first side portion 202 shows a scrollable, user-selectable and user-modifiable list of calendar events. The second side portion 204 shows a user-selectable, user-modifiable, scrollable fan list of contacts. In one aspect, the system provides defaults such as calendar information in the left fan and contact information in the right fan, but the user can establish personalized settings that deviate from the system defaults. The center portion 206 shows a graphical representation of one or more communication sessions, such as a telephone call, video conference, or instant messaging session. Each communication session can include one or more other user and one or more communication modality. In this example, the user interface represents each communication session using a spotlight metaphor. The spotlight shows which users are participating in the communication session. The interface 200 can include multiple spotlights for different concurrent communications sessions. However, the interface 200 features the active communication session as a spotlight is in the forefront of the interface. An active communication session is one in which the user is currently participating. For example, the user is speaking with his sister via telephone as an active communication session. If the user receives an instant message, the spotlight representing the telephone conversation swivels to a rear position in the interface to make room for the incoming instant messaging session, which is featured as the new active spotlight. In this example, user and/or system preferences can dictate whether or not the user is still talking on the telephone with his sister. The active spotlight indicates which communication session is the current target of user actions and input via the interface, and not necessarily in which communication session the user is communicating exclusively. The user can communicate via multiple communication sessions simultaneously. The active spotlight can be larger, rotated into a central position, brighter, a different illumination color, or so forth, than the non-active spotlight(s). The user interface can animate spotlight transitions from active to non-active and vice versa.

This exemplary user interface 200 arranges important functions along the left and right edges of the display/touch screen such that while the user is holding the device that they can use their thumbs to view, select and actuate the controls without changing their grip.

Figure 3:
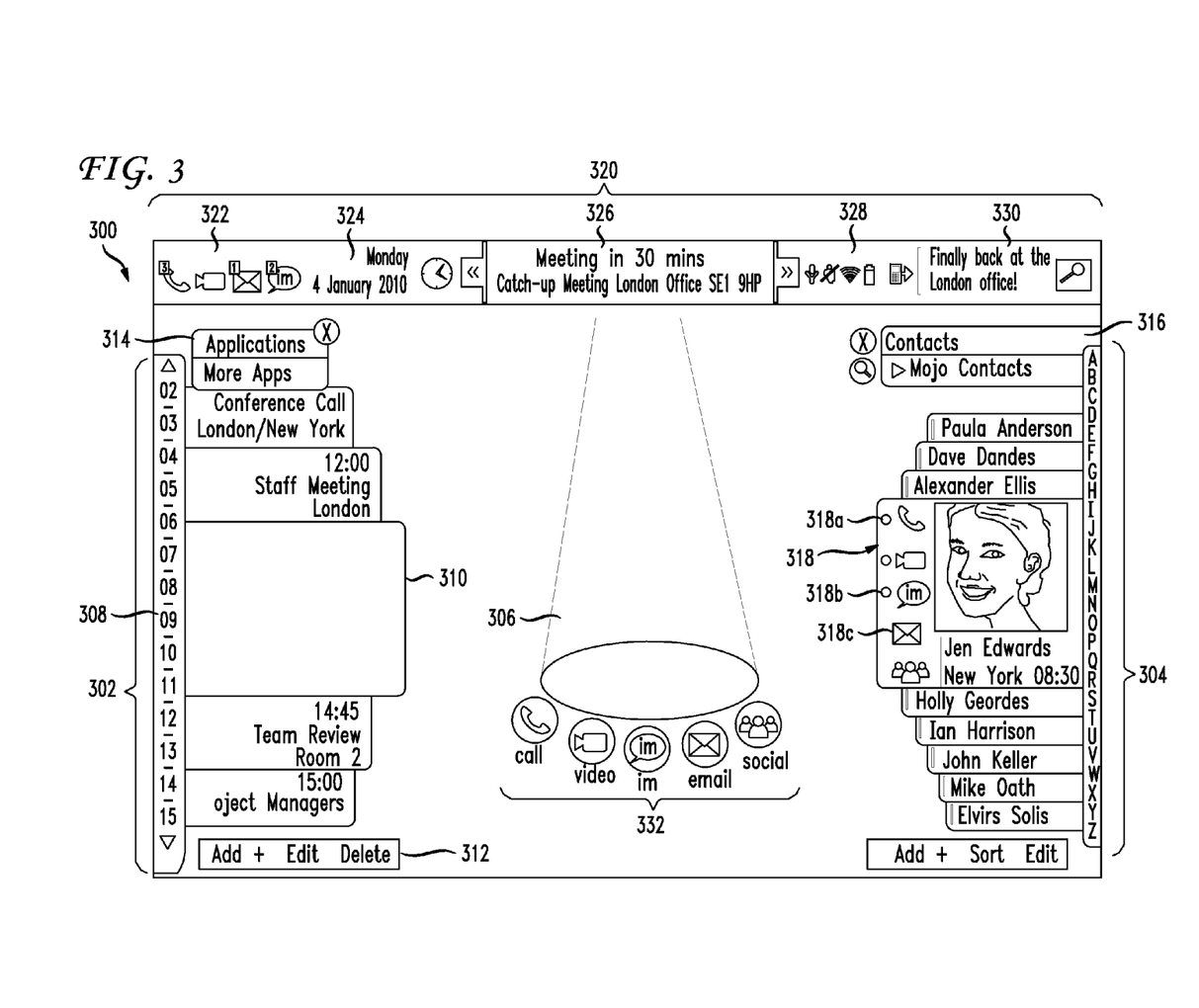
FIG. 3 illustrates a second example user interface.

When a user has a typical PC in use, windows open as applications over a desktop. Users must not only manage work within the window contents, the user must also manage the windows and the window layouts themselves by selectively minimizing and maximizing applications to prevent the screen from becoming too busy and cluttered. This interface draws the user's attention to an application, a communication session, or other collaborative materials such as documents or other resources using a different metaphor than the typical window presentation FIG. 3 illustrates a second, slightly more detailed example user interface 300. This interface 300 also includes a first side portion 302, a second side portion 304, and a center workspace 306 having a spotlight. The first side portion 302 in this example is a list of calendar events. The user can click, drag, flick, and/or scroll through a short fan list 310 of calendar events. A user can click on a calendar event to edit the event or view additional details. Further, the first side portion 302 can include an index 308 sorted by date, for example, so the user can quickly jump to other portions of the calendar to view different events. The first side portion 302 can also include a menu bar 312 for manipulating existing calendar events or for adding new calendar events. The user can also select the type of information displayed in the first side portion 302. A fan selection menu 314 allows the user to select a different type of information to display in the first side portion 302. For example, the user can select, via the fan selection menu 314, to display applications, contacts, or memos in place of calendar events.

The fan of calendar events 310, or scheduler, can contain information such as event, location, people involved, contact information, building maps, street maps, persistent communications sessions, current documents associated with recurring meetings, and other similar or relevant information. The scheduler can present information that the user may need for participating in or providing input to a scheduled meeting. In place of the scheduler or calendar fan, the system can display a set of sequenced applications such as a meeting preparation application, a communications session disconnect application, an urgent communications escalation application, or other applications.

Similarly, the user can select, via another fan selection menu 316, what data to display in the fan in the second side portion 304. In either fan of data, a center item (or other item in the fan) can be enlarged 318 to show additional details. In the case of an enlarged or expanded contact 318, the additional details can include availability 318*a*, 318*b*, 318*c*, based on the contact's presence information, for different communication modalities such as telephone, video conference, email, instant messaging, and text messaging. Further, the fan can include placeholders representing groups of contacts. When the user selects an icon or other representation of a group, the system can replace the existing fan with a new fan of the selected group, or the system can add a concentric or parallel fan to the inner or outer edge of the existing fan. A hierarchy of nested groups can generate a set of concentric fans or circles. The concentric fans or circles can partially overlap each other, can touch, or can be spaced apart. When the system displays a list of groups in the fan, the interface can highlight the group selected for display in the same way the center contact is highlighted. The system can display the channel icons on the left of the card for the group in the same way as an individual contact. In the group case, however, the presence indication can indicate the activity of the group. If one group member is using his/her phone, the phone icon will be yellow. If all group members are on line and available for an IM conference, the IM indicator for the group can be green.

Contact information can be listed such as home, work, or mobile phone numbers, email, IM, social media, and/or other types of communication links as needed to fully encompass the methods of contacting a specific party. In one aspect, the contact can be persona based, such as displaying a different photo based on work or home or based on a particular mode or medium of communication. The view of the contact can be contextual based on a particular topic of conversation or based on a relationship between the contact and the user. The expanded contact view can include photos, avatars, videos, social networking information, and other such depictions and information. The interface 300 can present contacts hierarchically, such as a listing of the person followed by home, work and other such variations, each with appropriate contact information or it can be displayed as a flat listing as selected or appropriate. The system can present contacts alphabetically, by queued frequency of use, by topic, by project, and/or the system can dynamically rearrange contacts between several combinations thereof. The level of trust between the parties can set limits with regard to the type and variety of icons and other personal information that is available for a single party. The icons can be static in some cases where the level of trust or some other factor makes fetching current updates impractical or impossible, or the icons can be dynamic and indicate the presence, context, persona, schedule, and/or other such factors of the party that one desires to communicate with. The system can present context and persona in the user interface locally or remotely based on this trust relationship with the other party or locally provided when such a trust relationship does not exist, e.g, the information may be pushed, pulled or stored locally. The users can select the appropriate contact icon to indicate which type of communication to initiate, for example.

The system can also display other contextual information next to the selected items in the fan. The system can display prior conversations with that contact, a map indicating where the contact works, common joint social network friends, and common interests, family notes such as birthdays or anniversaries, and so forth. The contact manager can be fully integrated with both telecommunications and computing functions and can be fed by a complex contact discovery mashup to add contacts to fully populate the equivalent of a vCard. In this way, not only does the user interface allow easy to use multimedia and multimodal communications, the interface also varies dynamically based on at least one participant or contact, such as a calling party and a called party.

Another element of the user interface is the spotlight in the center workspace 306. The interface uses the spotlight metaphor to add an application to a communication session. The application can be pushed from a local PC, pulled from an enterprise server, a cloud-based server, or requested as a resource from a licensing server or multi-media conferencing server. This spotlight and stage can be a simple two-party communications session in one communication modality or it can be a complex multi-party session in multiple communication modalities. The depiction of the session can simply be two icons or can be an arrangement of icons connected by shapes or otherwise grouped to show co-located and/or remotely located persons. The spotlight portion can show sidebars, alternate contact media/modes, and/or other information. After a session is launched, the interface 300 can show a media menu 332 containing controls appropriate to the media such as mute, ASR with scroll of text representing audio, or other such information for a voice call. Similarly, the interface can display other control information for alternate media and can display, for example, elapsed communication time, time remaining before another session is scheduled to begin, or the like. Below the center stage can be specific communications modes and media that can be used as described above. The system can also provide a search capability to easily add other parties to the communications session. Multiple parallel communications sessions can be launched and depicted via multiple spotlights. Each such spotlight can have any or all of the features provided above. The display can represent incoming calls or other communications sessions similarly. Further, any application can be launched either as a part of a communication session or independent of a communication session using the fan structure, and the spotlight metaphor.

Users can access messages with a rich feature set using the same center stage and spotlight paradigm. In order to switch between different activities and appropriately draw the user's gaze, the spotlights can rotate as if they were rotating on a theater stage. This interface allows for rotating between sessions and changes of spotlight, rapid toggling between SIP sessions, Google Waves, or other similar sessions. The user can make transitions more quickly and join multiple sessions together and split them apart. A user rotate gesture can manage the stage/spotlight and thereby rapidly switch between sessions. The same metaphor can be used to manage or toggle between applications, documents and other materials related to communication sessions.

This interface can include options to create and manipulate group communication sessions. A user assembles her conference roster and then the system recommends a communication channel to use for the conversation based on the availability of different communication channels for each potential participant. For example, if the user assemble 5 people for a communication and 2 people are already using their phones, the system can recommend an IM communication session. A similar metaphor applies for a group communication.

Further, the interface 300 can include a notification bar 320 for providing information as notifications which do not interrupt the current communication session in the spotlight 306 and which do not require additional interaction from the user. The notification bar 320 can include dedicated sections for different types of notifications, but the notification bar 320 can flexibly display notifications in any fixed or dynamic arrangement. The notification bar 320 can display multimedia images, animations, sound, vibrations, and so forth to provide alerts 322, date and time 324, reminders 326, a current status 328, and a current presence 330. The alerts 322 can include a number of pending or missed communications or communication attempts. For example, the system can show unread emails, unanswered instant messages, and missed telephone calls. The system can show reminders 326 of the next upcoming calendar event and some or all of the critical information associated with the upcoming calendar event, such as the title, time, date, reminder notes, and a countdown of how much time until the event is scheduled to occur, and so forth. The current status 328 and the presence 330 can show, for example, which communication modalities the user has available, a current status message, and so forth. The user can manipulate these settings by clicking on or tapping on the status notification area 328 or the present notification area 330.

The notification bar 320 can display temporal factors such as date, day, time, messages grouped by type (such as voice messages, email, IM, etc.), the user's current presence status, and/or conditional presence, a "what's up" view depicting the next scheduled activity in detail as an alternative to pop-ups. In other embodiments, the notification bar 320 can also include access to an office door communicator, video feed monitoring of an office environment, or other applications, media, or resources. The notification bar 320 can be at the top or bottom of the display or at some other location and can also show multiple line or link appearances, boss-assistant relationships, and other such information.

When a user receives an IM or email or has a meeting alert brought to their attention, it is typically done via a screen pop. The notification bar 320 provides a persistent, dedicated, space to present a "what's up" view of important information rather than have a randomly placed pop up driven by the application in question. This graphical metaphor shows rich connectivity information where the user can simultaneously add applications via the presentation metaphor. This approach differentiates session components from application components using the same graphical metaphor and selection/activation means for both.

At a high level, this interface for a mobile device with a touch screen combines contact information, schedule information, current communications information, and/or other critical multimedia or multimodal communications features into a single easy to use interface. Further, the key access and control mechanisms are arranged near the left and right hand sides of the display/touch screen. A combination of drop-down preselectors to determine the contents of the left and right fans and the fans are used to locate, view and actuate contacts, schedules, applications, and other collaboration materials. A fan is a graphical user interface element based on a Rolodex metaphor so a user can flip or scroll through the fan to browse to a particular contact. The user can manipulate the fan by clicking and dragging, flicking, tapping holding and dragging, tapping a scroll up or down button, and so forth. In another aspect, the fan can be thought of not as a Rolodex, but as the outer edge of a wheel with its center offscreen, so the user can rotate the wheel up and down to view different portions of the information stored on the wheel. In any case, the user interface can animate a scrolling motion as the user navigates through the contacts or other information presented in the fan. In one aspect, the size, position, shape, and/or responsiveness of the fan are designed based on an expected position and arc of a user's thumb while holding the device displaying the user interface. The curved, arcing gesture of a thumb on the touchscreen can control access to the fan or wheel.

Figure 4:
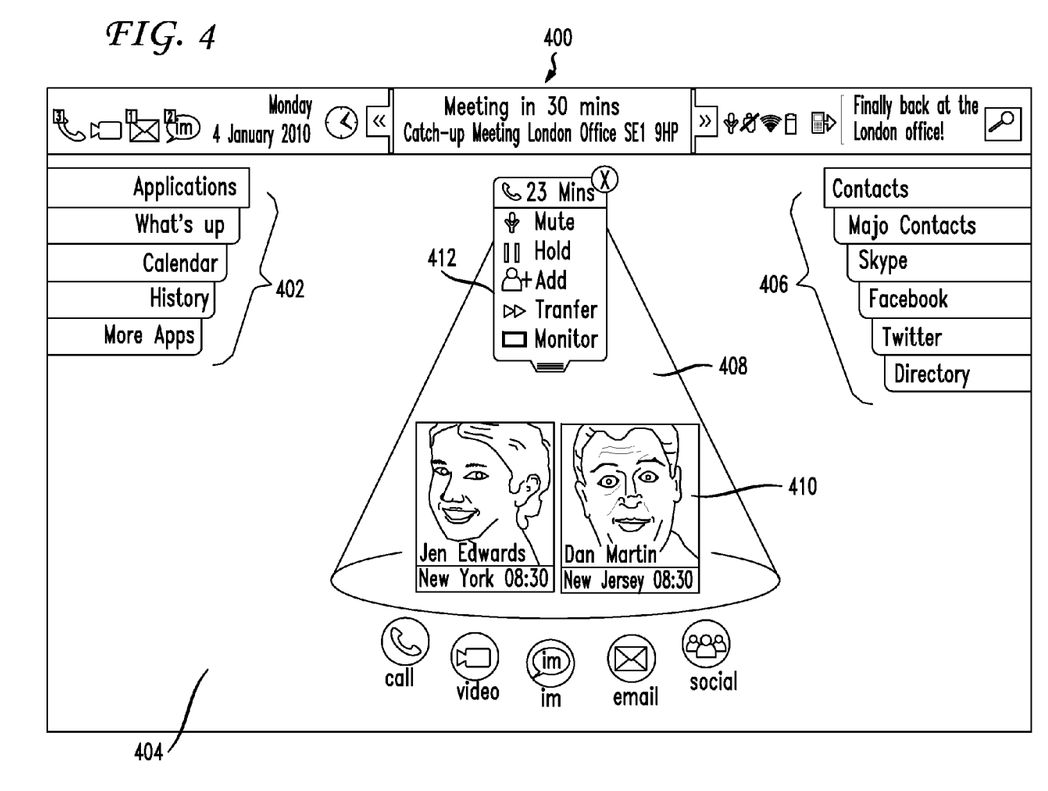
FIG. 4 illustrates a third example user interface.

FIG. 4 illustrates a third example user interface 400. In this example, the events fan 402 and the contacts fan 406 are minimized to an abbreviated view. The center region 404 includes a spotlight 408 representing a current communication session. The spotlight 408 includes one or more participant cards 410. Further, the interface 400 shows an expanded call control menu 412 for manipulating the spotlight 408 or participants associated with the communication session represented by the spotlight 408.

Figure 5:
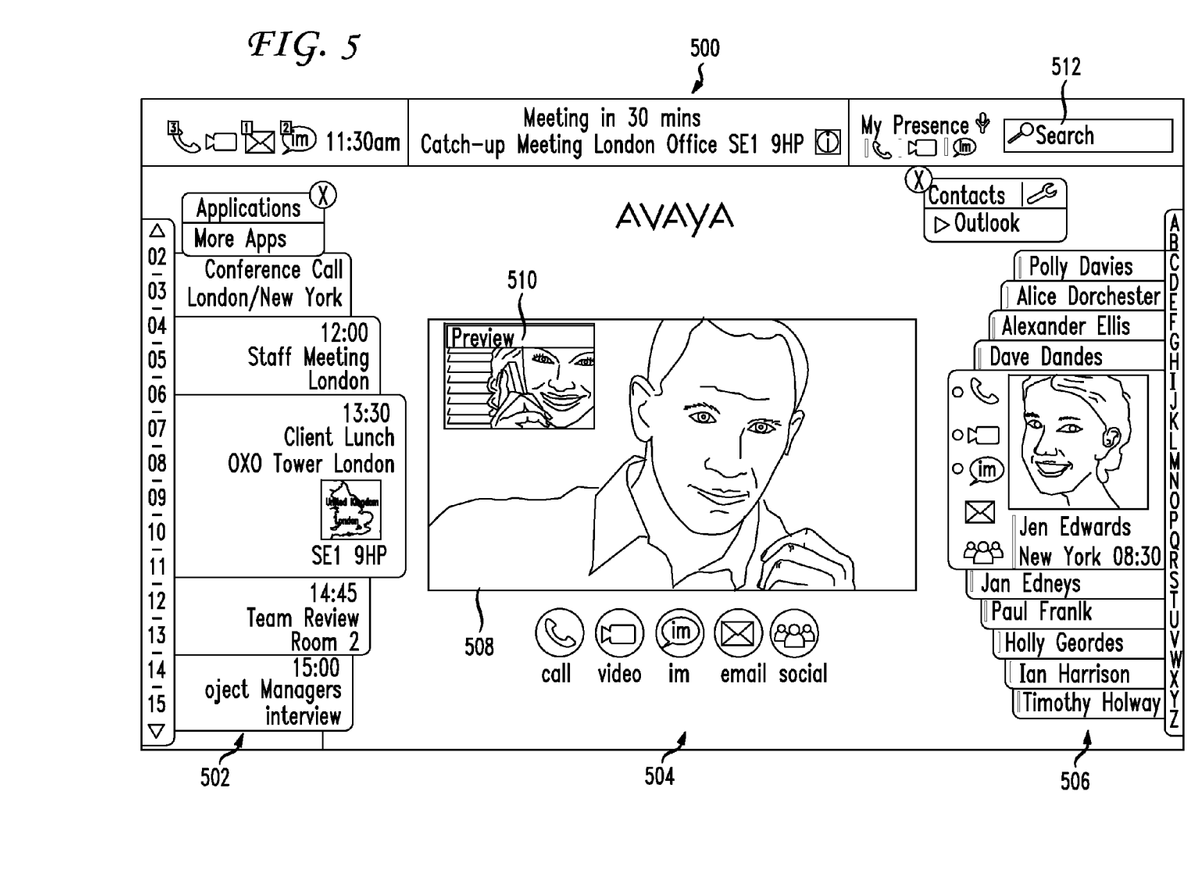
FIG. 5 illustrates a fourth example user interface.

FIG. 5 illustrates a fourth example user interface 500. In this example, the left region 502 and the right region 506 are normal size, and the center region 504 shows a video conference window in place of a spotlight. The video conference window includes a view of the other user in the video conference 508 and a smaller view of the user 510. The interface can present the video conference view in different ways as well. For example, in a four way video conference, each participant's video can be the same size instead of the large/small approach shown in FIG. 5. In one aspect, the interface 500 can include a button or other interface element to allow the user to toggle between a full screen mode and a non-full screen mode.

Figure 6:
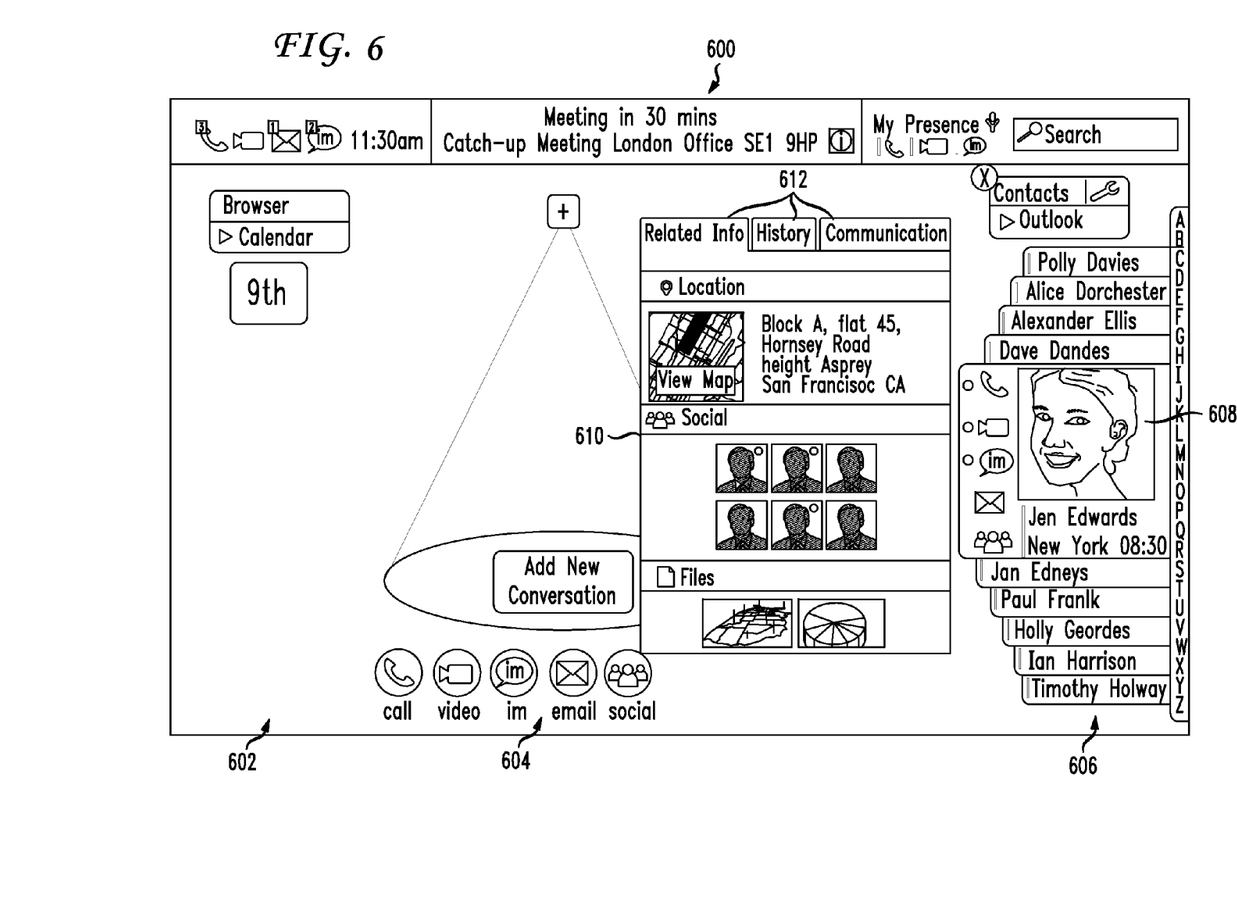
FIG. 6 illustrates a fifth example user interface.

FIG. 6 illustrates a fifth example user interface 600 for displaying contextual people and information. In this interface, the calendar fan 602 is minimized and the contacts fan 606 is not minimized. The center area 604 shows a spotlight that does not have a current communication session, but is ready to accept or initiate a communication session. In this example, the user has navigated to the contact Jen Edwards and clicked or tapped on her entry for additional information. The system displays a contextual information popup 610 including information such as her address, social network, stored files, previous conversations with the user, and so forth. The popup 610 can include additional tabs 612 for categorizing additional information. The user can manipulate the information and/or the sources of information in the popup 610.

Figure 7:
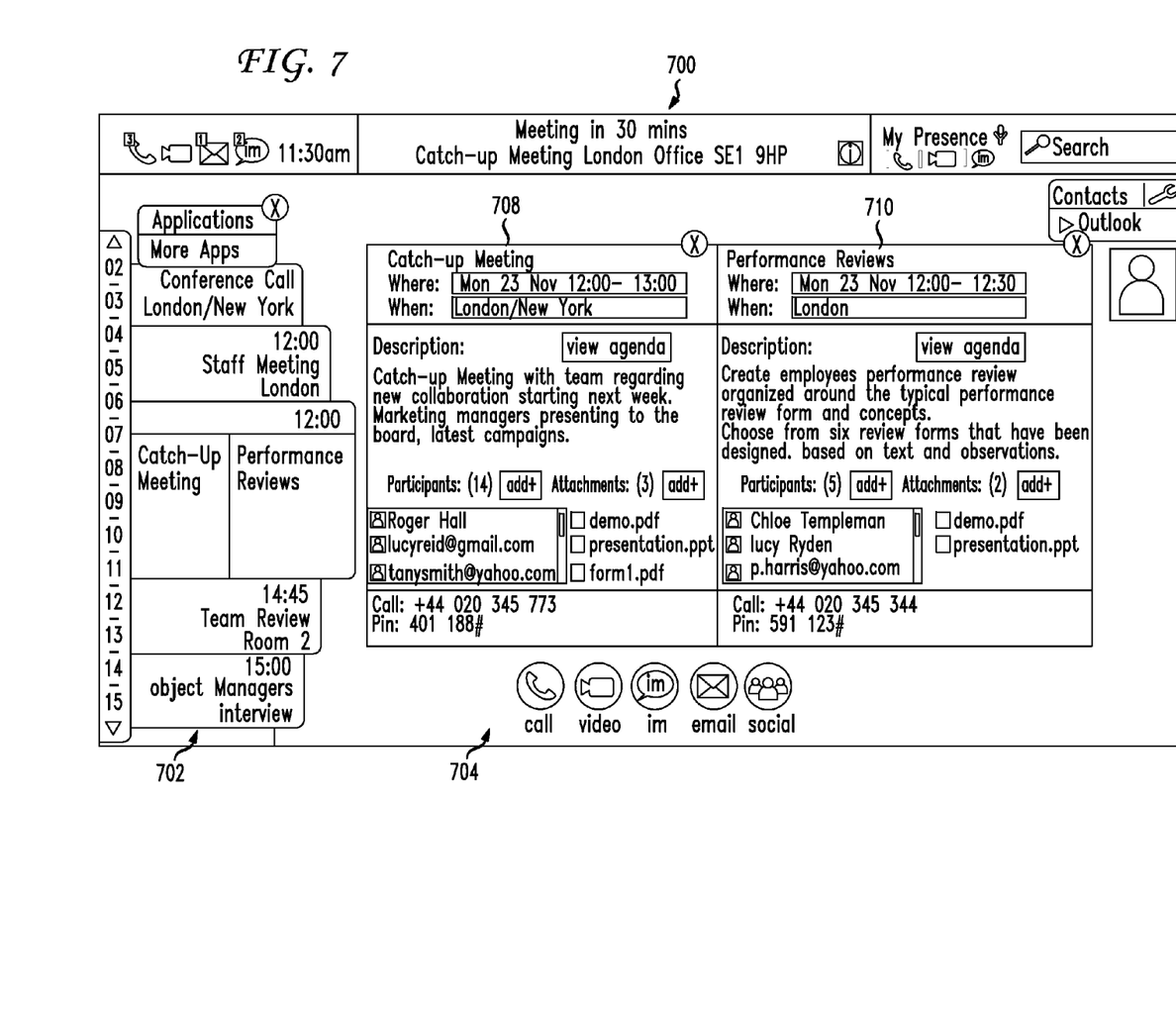
FIG. 7 illustrates a sixth example user interface.

FIG. 7 illustrates a sixth example user interface 700. In this interface, the calendar fan 702 is expanded and the contacts fan 706 is minimized. The user can select or open two calendar events from the calendar fan 702. The interface 700 displays the calendar events 708, 710 side by side in the center region 704 for the user to manipulate. The user can transfer individual elements of one calendar event to another. The user can edit details of each calendar event and delete calendar events.

Figure 8:
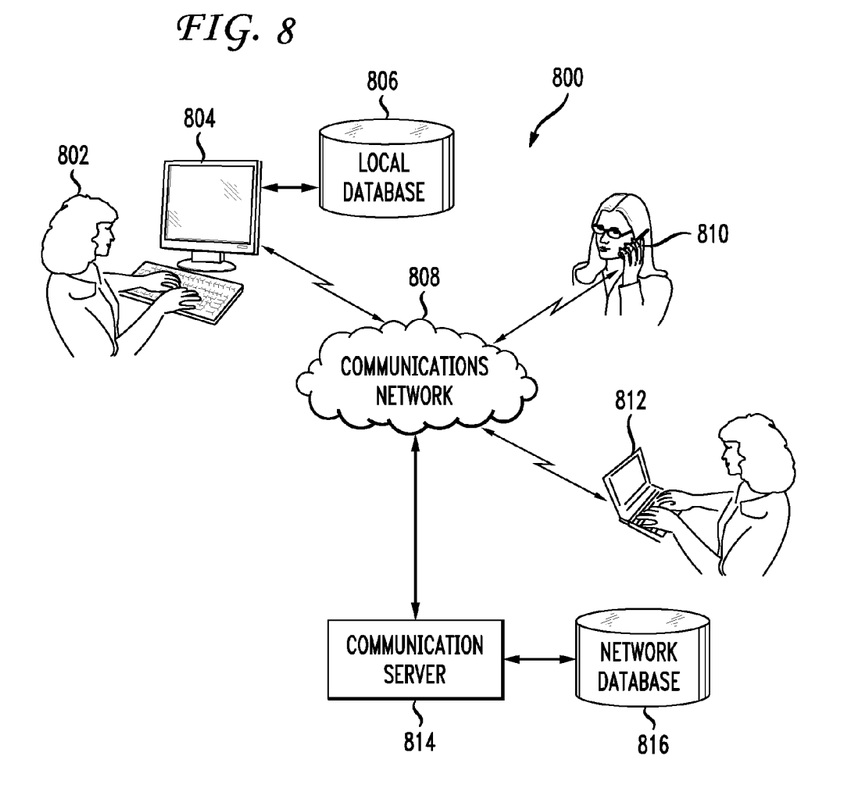
FIG. 8 illustrates an example communications infrastructure.

FIG. 8 illustrates an example communications infrastructure 800. In this example, a user 802 communicates via a mobile or portable communications device 804 with other users 810, 812 in a communication session. The communications device 804 can include a local database 806 for storage. The different users' devices can communicate one with another via a communications network 808 that can be a wired and/or wireless network, such as the Internet or other suitable telecommunications network. In one aspect, one of the user devices acts as a server for running the communication session. In another aspect, a communications server 814 with a network based database 816 manages the communication session. When the user device 804 generates the user interface, the device can pull data, such as contact information, presence information, images, documents, and other resources, from one or more of the local database 806, the network database 816, or databases at other users' locations.

Figure 9:
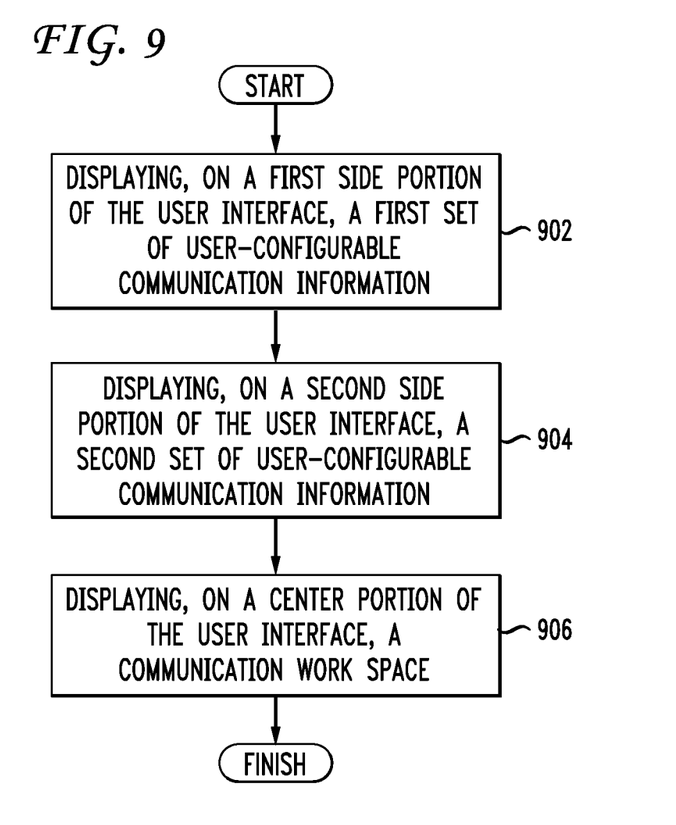
FIG. 9 illustrates an example method embodiment.

Having disclosed some basic system components, the disclosure now turns to the exemplary method embodiment shown in FIG. 9. For the sake of clarity, the method is discussed in terms of an exemplary system 100 as shown in FIG. 1 configured to display a user interface for managing communication sessions on a communications device. The system 100 displays, on a first side portion of the user interface, a first set of user-configurable communication information (902) and displays, on a second side portion of the user interface, a second set of user-configurable communication information (904). The communications device can receive user input via a touch sensitive display via skin contact and/or a stylus, for example. The device can also receive other inputs such as gestures, keyboard input, mouse input, and so forth. The first set of user-configurable communication information and the second set of user-configurable communication information can each be, for example, contact information, schedule information, current communication session information, applications, and/or other multimedia communication features. Contact information can include a name, phone number, email address, instant messaging address, social media link, an image, presence information, relationship information, business information, personal notes, and other communication links. The system 100 can display the contact information based on at least one of alphabetical order and frequency of use. The frequency of use can be based further on at least one of topic, project, and recency of use. In one embodiment, a level of trust between a user and a particular contact restricts which pieces of contact information are displayed for the particular contact. Contacts can be organized in the fan of contacts into expandable groups. The side portions of the user interface can be, for example, on the left side and right side of the device screen. The fans can include an index associated with the first set of user-configurable communication information, such as an alphabetical index to quickly jump to a particular set of information.

The system 100 displays, on a center portion of the user interface, a communication work space including an active spotlight region (906). The work space can display at least one current communication session. The interface can also include controls and settings based on the at least one current communication session. In one aspect, the system 100 further receives user input to toggle from an active communication session from a first current communication session to a second communication session, sets the second communication session as the active communication session, and updates the communication work space to reflect the active communication session. The specific examples are illustrative and can be implemented in different ways without departing from the spirit and scope of the disclosure.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
displaying, on a side portion of a user interface for a first user, a fan comprising a plurality of graphical user interface elements that are scrollable by the first user, wherein an active graphical user interface element of the plurality of graphical user interface elements displays communication information associated with a second user different from the first user, and wherein inactive graphical user interface elements of the plurality of graphical user interface elements display truncated communication information; and
displaying, on the user interface, an active spotlight region that depicts, by using a visual metaphor that resembles a spotlight, an active communication session that the first user is currently participating in, the active spotlight region featuring graphical elements representing participants associated with the active communication session.

2. The method of claim 1, wherein the user interface is associated with a communications device, and wherein the communications device receives user input via a touch sensitive display.

3. The method of claim 1, wherein the communication information comprises one of contact information, schedule information, current communication session information, applications, and other multimedia communication features.

4. The method of claim 1, wherein the communication information comprises one of a name, a phone number, an email address, an instant messaging address, a social media link, an image, presence information, relationship information, business information, a personal note, and a communication link.

5. The method of claim 1, wherein the communication information is presented based on one of alphabetical order and a frequency of use.

6. The method of claim 5, wherein the frequency of use is based on one of topic, project, and a recency of use.

7. The method of claim 3, wherein a trust level between the first user and a particular contact restricts which pieces of contact information are displayed for the particular contact.

8. The method of claim 3, wherein part of the contact information is organized into an expandable group.

9. The method of claim 1, wherein the side portion is a first side portion, wherein the fan is a first fan, and wherein the plurality of graphical user interface elements is a first plurality of graphical user interface elements, the method further comprising displaying, on a second side portion of the user interface, a second fan comprising a second plurality of graphical user interface elements that are scrollable by the first user.

10. The method of claim 1, wherein the fan allows the first user to navigate through each graphical user interface element by one of flipping and scrolling through the plurality of graphical user interface elements.

11. The method of claim 10, further comprising:
receiving from a user a touch input directed to the fan; and
scrolling the based on the touch input.

12. The method of claim 1, wherein a detail of the communication information is displayed in the communication work space when the first user interacts with the active graphical user interface element.

13. The method of claim 12, further comprising displaying one of a control and a setting, based on the current communication session.

14. The method of claim 12, further comprising:
receiving user input to toggle the active communication session from a first current communication session to a second communication session;
setting the second communication session as the active communication session; and
updating the active spotlight region to reflect a status of the active communication session.

15. The method of claim 1, further comprising displaying on the side portion an index associated with the fan.

16. The method of claim 1, further comprising displaying a notification bar on the user interface.

17. The method of claim 16, wherein the notification bar comprises one of an alert, a time, a date, a reminder, a current user status, a current user presence.

18. The method of claim 1, further comprising displaying a media menu of a communication modality.

19. A system comprising:
a processor;
a display; and
a computer-readable storage medium storing instructions which, when executed by the processor, cause the processor to perform operations comprising:
displaying, on a side portion of the display used by a first user, a fan comprising a plurality of graphical user interface elements that are scrollable by the first user, wherein an active graphical user interface element of the plurality of graphical user interface elements displays communication information associated with a second user different from the first user, and wherein inactive graphical user interface elements of the plurality of graphical user interface elements display truncated communication information;
displaying, on the display, an active spotlight region that depicts, by using a visual metaphor that resembles a spotlight, an active communication session that the first user is currently participating in, the active spotlight region featuring graphical elements representing participants associated with the active communication session.

20. A computer-readable storage device storing instructions which, when executed by a processor, cause the processor to perform operations comprising:
displaying, on a side portion of the user interface for a first user, a fan comprising a plurality of graphical user interface elements that are scrollable by the first user, wherein an active graphical user interface element of the plurality of graphical user interface elements displays communication information associated with a second user different from the first user, and wherein inactive graphical user interface elements of the plurality of graphical user interface elements display truncated communication information; and
displaying, on the user interface, an active spotlight region that depicts, by using a visual metaphor that resembles a spotlight, an active communication session that the first user is currently participating in, the active spotlight region featuring graphical elements representing participants associated with the active communication session.

* * * * *

UNITED STATES PATENT AND TRADEMARK OFFICE
CERTIFICATE OF CORRECTION

| | | |
|---|---|---|
| PATENT NO. | : 9,158,444 B2 | Page 1 of 1 |
| APPLICATION NO. | : 12/978884 | |
| DATED | : October 13, 2015 | |
| INVENTOR(S) | : David G. Boyer | |

It is certified that error appears in the above-identified patent and that said Letters Patent is hereby corrected as shown below:

IN THE CLAIMS

<u>Column 13</u>,

Line 10, replace "scrolling the based on the touch input" with --scrolling the fan based on the touch input--

Line 32, replace "user status, a current user presence." with --user status, or a current user presence.--

<u>Column 14</u>,

Line 23, replace "displaying, on a side portion of the user interface for a first" with --displaying, on a side portion of a user interface for a first--

Signed and Sealed this
Fifteenth Day of March, 2016

Michelle K. Lee
*Director of the United States Patent and Trademark Office*